United States Patent
Kogure et al.

(10) Patent No.: US 10,847,280 B2
(45) Date of Patent: Nov. 24, 2020

(54) WIRE HARNESS

(71) Applicant: YAZAKI CORPORATION, Tokyo (JP)

(72) Inventors: Naoto Kogure, Shizuoka (JP); Katsumi Sato, Shizuoka (JP); Kosuke Tomosada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/554,576

(22) Filed: Aug. 28, 2019

(65) Prior Publication Data

US 2020/0098489 A1 Mar. 26, 2020

(30) Foreign Application Priority Data

Sep. 25, 2018 (JP) .................. 2018-178365

(51) Int. Cl.
| | |
|---|---|
| *H01B 7/02* | (2006.01) |
| *H01B 7/00* | (2006.01) |
| *H01B 7/04* | (2006.01) |
| *H01B 7/08* | (2006.01) |
| *H01B 7/18* | (2006.01) |

(52) U.S. Cl.
CPC ......... *H01B 7/0009* (2013.01); *H01B 7/0045* (2013.01); *H01B 7/04* (2013.01); *H01B 7/0892* (2013.01); *H01B 7/184* (2013.01)

(58) Field of Classification Search
CPC ........ H01B 7/02; H01B 7/009; H01B 7/0045; H01B 7/082; H01B 7/04; H01B 7/06; H01B 9/02; H01B 9/04; H01B 7/148

USPC .......... 174/110 R, 112, 113 R, 117 R, 117 F, 174/117 FF
See application file for complete search history.

(56) References Cited

U.S. PATENT DOCUMENTS

| | | | | |
|---|---|---|---|---|
| 3,459,879 | A * | 8/1969 | Gerpheide | H01B 7/08 174/117 FF |
| 4,382,236 | A * | 5/1983 | Suzuki | H01P 3/085 333/1 |
| 5,342,997 | A * | 8/1994 | Kanno | H01B 7/0838 156/51 |
| 2007/0240898 | A1* | 10/2007 | Reichert | H01B 7/0838 174/117 F |

(Continued)

FOREIGN PATENT DOCUMENTS

| | | |
|---|---|---|
| JP | 2002-222615 A | 8/2002 |
| JP | 2002-367439 A | 12/2002 |

(Continued)

*Primary Examiner* — Willliam H. Mayo, III
(74) *Attorney, Agent, or Firm* — Kenealy Vaidya LLP

(57) ABSTRACT

A wire harness including a round electric wire and a flat electric wire. The round electric wire includes a round conductor made of a predetermined metal and having a round cross-sectional shape and a first coating portion. The flat electric wire includes a flat conductor having a flat cross-sectional shape and a second coating portion. The round electric wire and the flat electric wire are arranged in parallel. The round conductor has a diameter equal to or less than a predetermined reference value. The flat conductor has a thickness equal to or less than the reference value and a width in which ensure cross-sectional area of the flat conductor more than area of a circle having a diameter equal to the reference value.

8 Claims, 4 Drawing Sheets

(56) References Cited

U.S. PATENT DOCUMENTS

2008/0053682 A1\* 3/2008 Victor .................... H01B 11/12
                                                                                          174/110 R
2010/0243292 A1\* 9/2010 Telley ................ H01B 13/0023
                                                                                          174/117 F

FOREIGN PATENT DOCUMENTS

| | | |
|---|---|---|
| JP | 2013-37801 A | 2/2013 |
| JP | 2013-37805 A | 2/2013 |

\* cited by examiner

WIRE HARNESS

CROSS REFERENCE TO RELATED APPLICATIONS

This application claims priority from Japanese Patent Application No. 2018-178365 filed on Sep. 25, 2018, the entire contents of which are incorporated herein by reference.

BACKGROUND OF THE INVENTION

Field of the Invention

The present invention relates to a wire harness.

Description of Related Art

Conventionally, there has been known a flexible flat cable (hereinafter, referred to as an FFC) coated with an insulating resin so as to sandwich a plurality of flat conductors arranged in parallel from above and below. Compared to an electric wire (hereinafter referred to as a round electric wire) having a circular conductor cross section, the FFC has a large surface area and is excellent in heat dissipation, and thus may be used for an automobile. In addition, similar to the FFC, there is also a flexible printed circuit board (hereinafter referred to as FPC) in which a circuit pattern is formed on a flexible board.

In a case where a flat electric wire such as the FFC or the FPC is used for the automobile, if there is an increase or decrease in an automobile circuit, it is necessary to review the entire circuit configuration of the flat electric wire, which makes it difficult to cope with increase or decrease in the circuit.

Therefore, in order to cope with this problem, a wire harness in which a round electric wire is extended in parallel with respect to a flat electric wire has been proposed (see Patent. Literatures 1 to 3). In the wire harness, even when there is an increase or decrease in an automobile circuit, by changing the round electric wire, it is not necessary to review the entire circuit configuration of the flat electric wire, and it is possible to facilitate coping with the increase and decrease in the circuit.

[Patent Literature 1] JP-A-2002-367439
[Patent Literature 2] JP-A-2013-37801
[Patent Literature 3] JP-A-2013-37805

However, for the round electric wire, a diameter of a conductor (hereinafter, referred to as a round conductor) having a circular cross section tends to be larger than a thickness of a flat conductor of the flat electric wire. The reason for this is as follows. A cross-sectional area of the conductor determined by a current value (allowable current value) flowing through the conductor. For the flat electric wire, since the flat conductor has a constant thickness, the flat conductor tends to increase in a width direction (direction orthogonal to a thickness direction in a cross-sectional view) when the allowable current value increases. However, for the round electric wire, the diameter of the round conductor increases when the allowable current value increases. Accordingly, for the round electric wire, the diameter of the round conductor tends to be larger than the thickness of the flat conductor of the flat electric wire.

Here, for the round conductor having a large diameter, a strain applied at the time of bending tends to be larger. Therefore, in a case where a wire harness in which the round electric wire and the flat electric wire are mixed is used for a bent portion to which bending is repeatedly applied, only the round electric wire is disconnected first (including a case where a resistance value is increased by a predetermined value or more), and it never be said that a bending resistance of the wire harness is high. Therefore, when the number of round electric wires is reduced, the bending resistance of the wire harness can be improved, but when there is an increase or decrease in the automobile circuit, a circuit configuration of the flat electric wire is likely to be reviewed, which makes it difficult to cope with the increase or decrease in the circuit.

SUMMARY

One or more embodiments provide a bending resistance while facilitating coping with an increase and decrease in a circuit, in a wire harness in which a round electric wire and a flat electric wire are extended in parallel.

A wire harness including a round electric wire and a flat electric wire. The round electric wire includes a round conductor made of a predetermined metal and having a round cross-sectional shape and a first coating portion. The flat electric wire includes a flat conductor having a flat cross-sectional shape and a second coating portion. The round electric wire and the flat electric wire are arranged in parallel. The round conductor has a diameter equal to or less than a predetermined reference value. The flat conductor has a thickness equal to or less than the reference value and a width in which ensure cross-sectional area of the flat conductor more than area of circle having a diameter equal to the reference value.

The present invention is a wire harness in which a round electric wire and a flat electric wire are arranged in parallel. A round conductor of the wire harness has a diameter equal to or less than a predetermined reference value, and a flat conductor of the wire harness has a thickness equal to or less than the reference value, and has a width sufficient to ensure the same cross-sectional area as the round conductor having a diameter exceeding the reference value.

According to the present invention, since the round conductor has the diameter equal to or less than the predetermined reference value, the flat conductor has the thickness equal to or less than the reference value, so that a bending resistance can be improved. Further, since the flat conductor has the width sufficient to ensure the same cross-sectional area as the round conductor having the diameter exceeding the reference value, the flat electric wire functions as a substitute for the round electric wire having a round conductor exceeding the reference value, and the number of round electric wires cannot be reduced more than necessary. Accordingly, it is less likely to occur that the number of round electric wires decreases and it is difficult to cope with the increase or decrease in circuit. Therefore, in the wire harness in which the round electric wire and the flat electric wire are extended in parallel, it is possible to improve the bending resistance while facilitating coping with the increase or decrease in the circuit.

According to one or more embodiments, in a wire harness in which a round electric wire and a flat electric wire are extended in parallel, it is possible to increase a bending resistance while facilitating coping with an increase or decrease in the circuit.

DETAILED DESCRIPTION

Hereinafter, the present invention will be described in accordance with a preferred embodiment. The present invention is not limited to the following embodiments, and can be modified as appropriate without departing from the scope of the present invention. In addition, in the embodiment described below, some configurations are not shown or described, but it goes without saying that a known or well-known technique is applied as appropriate to details of an omitted technique within a range in which no contradiction occurs to contents to be described below.

Figure 1:
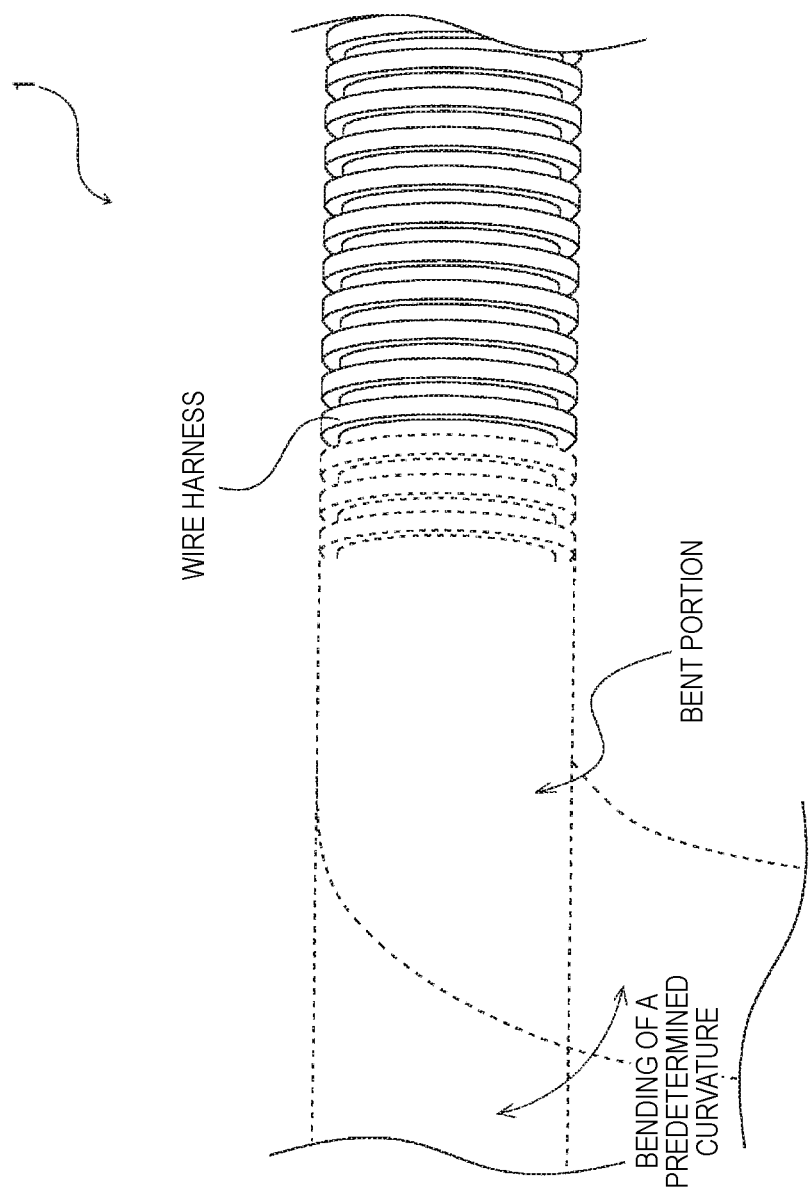
FIG. 1 is a perspective view showing a wiring structure of a wire harness according to an embodiment of the present invention.

FIG. 1 is a perspective view showing a wiring structure of a wire harness according to an embodiment of the present invention. A wiring structure 1 of a wire harness WH shown in FIG. 1 has a structure in which the wire harness WH is wired at a bent portion BP. The bent portion BP is a portion at which a bending of a predetermined curvature is repeatedly applied in a surface folding direction of a flat conductor of a flat electric wire described later. The predetermined curvature differs depending on the bent portion BP at which the wire harness WH as wired, and has different values at the bent portion BP of a slide door and the bent portion BP of a door that is normal opened/closed, for example. In addition, the predetermined curvature may be different depending on each vehicle, each grade, or the like.

Figure 2:
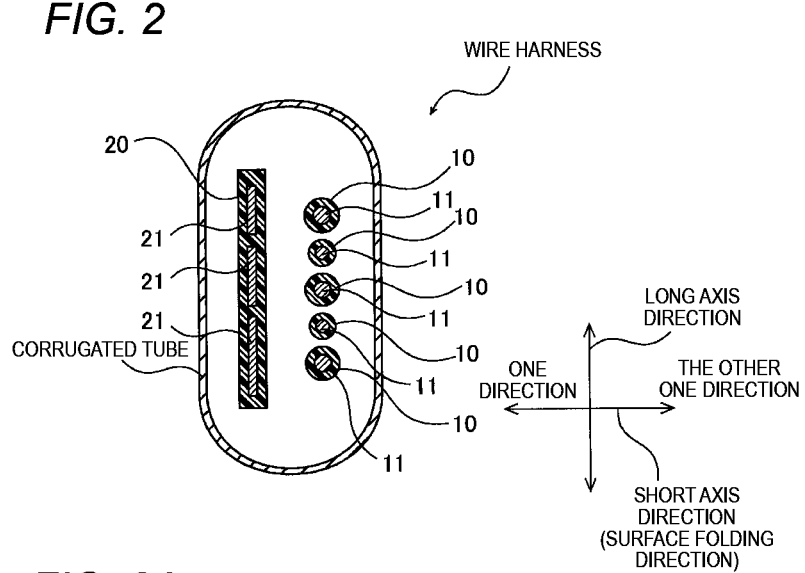
FIG. 2 is a sectional view showing the wire harness shown in FIG. 1.

FIG. 2 is a sectional view showing the wire harness WH shown in FIG. 1. As shown in FIG. 2, the wire harness WH includes a plurality of round electric wires 10, a flat electric wire 20, and a corrugated tube COT. Although the wire harness WH including the plurality of round electric wires 10 and one flat electric wire 20 will be described as an example, is not limited to this. The number of the round electric wires 10 may be one, and the number of flat electric wires 20 may be plural.

Figure 3A:
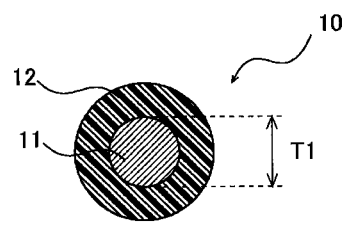
FIG. 3A is an enlarged cross section of a round electric wire of the wire harness shown in FIG. 2.
Figure 3B:
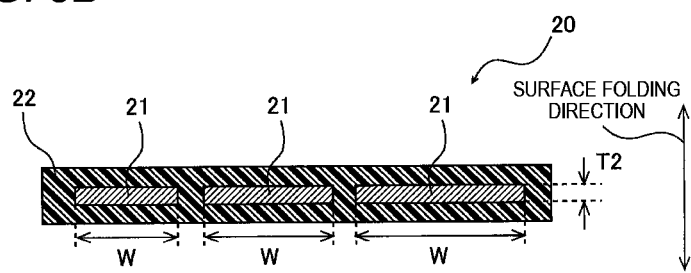
FIG. 3B shows an enlarged cross section of a flat electric wire of the wire harness shown in FIG. 2.

In FIG. 3, FIG. 3A is an enlarged cross section of the round electric wire 10 of the wire harness WH shown in FIG. 2, and FIG. 3B shows an enlarged cross section of the flat electric wire 20 of the wire harness WH shown in FIG. 2.

As shown in FIG. 3A, the round electric wire 10 is an electric wire in which an insulating coating portion T2 is formed on a round conductor 11 having a round cross-sectional shape. The round conductor 11 is made of a predetermined metal such as copper, aluminum, or an alloy thereof having a certain degree of conductivity or more. A reference numeral T1 indicates a diameter of the round conductor 11.

As shown in FIG. 3B, the flat electric wire 20 is an electric wire in which an insulating coating portion 22 is formed collectively with a plurality of flat conductors 21 having a flat cross-sectional shape (for example, flat quadrangle). The flat conductor 21 is made of the same metal as the round conductor 11, for example. In the flat electric wire 20, a thicknesses T2 of the plurality of flat conductors 21 are unified to the same value. On the other hand, in the flat electric wire 20 according to the present embodiment, the plurality of flat conductors 21 have different widths W, for example.

The corrugated tube COT shown in FIG. 2 is a protective tube having a rigidity higher than that of the coating portions 12, 22 in which the round electric wires 10 and the flat electric wire 20 are accommodated. The corrugated tube COT according to the present embodiment is formed so as to have an oblong cross section, and has a structure in which the flat electric wire 20 is accommodated along a long axis direction of the oblong and the plurality of round electric wires 10 and the flat electric wire 20 are stacked in a short axis direction.

Since the corrugated tube COT has the oblong cross section, the corrugated tube COT is easily bent in the short axis direction and is hardly bent in the long axis direction. In the wire harness WH of the present embodiment, directions of the corrugated tube COT and the flat electric wire 20 are adjusted so that a bending direction at the bent portion BP is the short axis direction. As a result, at the bent portion BP, the bending of the predetermined curvature is repeatedly applied in the surface folding direction (see FIG. 3B) of the flat conductor 21.

In a case where the wire harness WH is bent in the short axis direction (surface folding direction) of the corrugated tube COT, radii of curvature at a bent inner side and a bent outer side are different. In the present embodiment, a larger one of the curvature of the flat conductor 21 at the time of bending in one direction of the surface folding direction and the curvature of the round conductor 11 at the time of bending in the other one direction of the surface folding direction is taken as the predetermined curvature.

In the present embodiment, the round conductor 11 is limited to one having a diameter T1 equal to or less than the reference value, and the flat conductor 21 has the thickness T2 equal to or less than the reference value and a width W in which ensure a cross-sectional area (the same allowable current) of the flat conductor more than area of a circular having the diameter equal to the reference value.

The reference value is a predetermined value, and is a value determined to be equal to or less than a bending endurance limit value in the present embodiment. The bending endurance limit value refers to a minimum value of a thickness in a surface folding direction of a predetermined metal that satisfies a predetermined disconnection condition when a bending of the predetermined curvature described above is repeatedly applied a predetermined number of times in the surface folding direction. Hereinafter, it will be described in detail.

First, when the bending (bending in a plastic area) of the predetermined curvature is applied to the metal, a strain is generated. Then, the strain is accumulated by repeating the bending of predetermined curvature, and eventually the metal is broken. Here, at the time of the bending, when the thickness in the bending direction increases, the strain also tends to increase.

Figure 4:
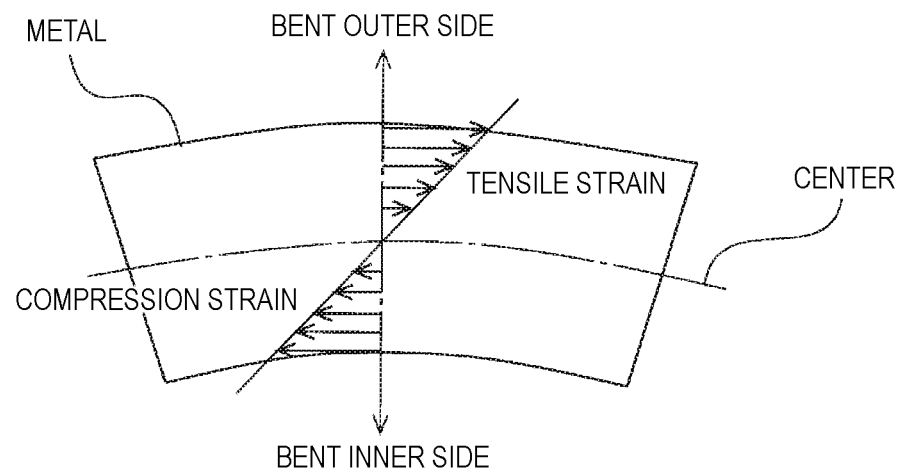
FIG. 4 is a conceptual diagram showing a strain when a metal is bent.

FIG. 4 is a conceptual diagram showing the strain when the metal is bent. As shown in. FIG. 4, it is assumed that the bending with a thickness center position c of a metal MT as a reference is applied. In this case, a strain is generated due to the metal MT being compressed at a position apart from the thickness center position c toward the bent inner side. A compression strain increases as a distance from the thickness center position c toward the bent inner side increases. In addition, a strain is generated due to the metal MT being pulled at a position apart from the thickness center position c toward a bent outer side. A tensile strain increases as a distance from the thickness center position c toward the bent outer side increases. Accordingly, the larger the thickness in the bending direction is, the larger the strain.

As described above, in a case where the bending of the predetermined curvature described above is repeatedly applied the predetermined number of times in the surface folding direction, a predetermined disconnection condition is satisfied when the thickness is equal to or more than a certain thickness, and the predetermined disconnection condition is not satisfied when the thickness is less than the certain thickness. The bending endurance limit value is the minimum value of the thickness that satisfies the disconnection condition.

The predetermined disconnection condition and the predetermined number of times are determined by an environment using the wire harness WH. That is, depending on a position where the wire harness WH is used, a condition that "the increase in a resistance value is less than 10% with respect to the bending of the predetermined curvature of 10000 times" is defined. Among them, the "10000 times" corresponds to the predetermined number of times, and "the increase in the resistance value is not less than 10%", that is, "the increase in the resistance value is 10% or more" corresponds to the disconnection condition. Incidentally, depending on the environment in which the wire harness WH is used, there may be a case where a condition that "the increase in the resistance value less than 5% with respect to the bending of the predetermined curvature of 1000000 times" is defined. In this case, the "1000000 times" corresponds to the predetermined number of times, and "the increase in the resistance value is 5% or more" corresponds to the disconnection condition.

Figure 5:
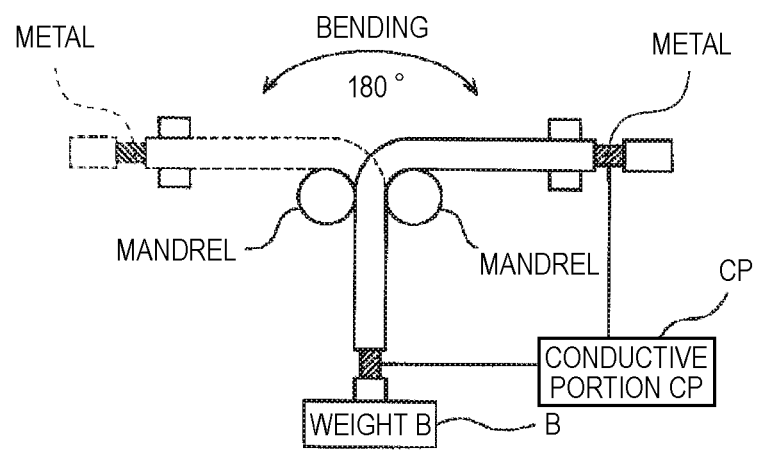
FIG. 5 is a conceptual diagram showing a method of obtaining a bending endurance limit value which satisfies a disconnection condition in the wire harness according to the present embodiment.

FIG. 5 is a conceptual diagram showing a method of obtaining the bending endurance limit value which satisfies the disconnection condition in the wire harness WH according to the present embodiment. The bending endurance limit value is obtained using a bending tester shown in FIG. 5.

Specifically, from a state where one end of the electric wire coated with the metal MT having a predetermined thickness (diameter) was fixed and the electric wire was straightened, for example, the other end side of the electric wire was repeatedly bent at an angle range of −90° to 90° using a mandrel M with a bending radius of 12.5 mm at a room temperature (20° C.), and the number of times of bending (the number of reciprocations) when the metal MT satisfied the disconnection condition was measured. Whether or not the disconnection condition was satisfied was determined based on whether or not a resistance value of a conductive portion CP was increased by a predetermined value (10%) or more using the conductive portion CP. A load of a weight B attached to one end of the electric wire was 400 g. In addition, a bending speed was 30 rpm. The angle range of the other end side of the electric wire, the diameter of the mandrel M, the load of the weight B, and the bending speed can be changed according to the use environment of the wire harness WH.

In the above example, assuming that the predetermined number of times (that is, the number of times of bending obtained in the use environment) related to the disconnection condition was 10000 times, in a case where the thickness (diameter) was 1 mm or less, the result was more than 10000 times that is the predetermined number of times. On the other hand, in a case where the thickness (diameter) was 1.1 mm or more, the result was less than 10000 times that is the predetermined number of times. Through the test described above, it was found that the bending endurance limit value in the above case was 1 mm.

As described above, the bending endurance limit value can be obtained by the test. Incidentally, if possible, the bending endurance limit value may be a value calculated by a mathematical formula or the like.

Figure 6:
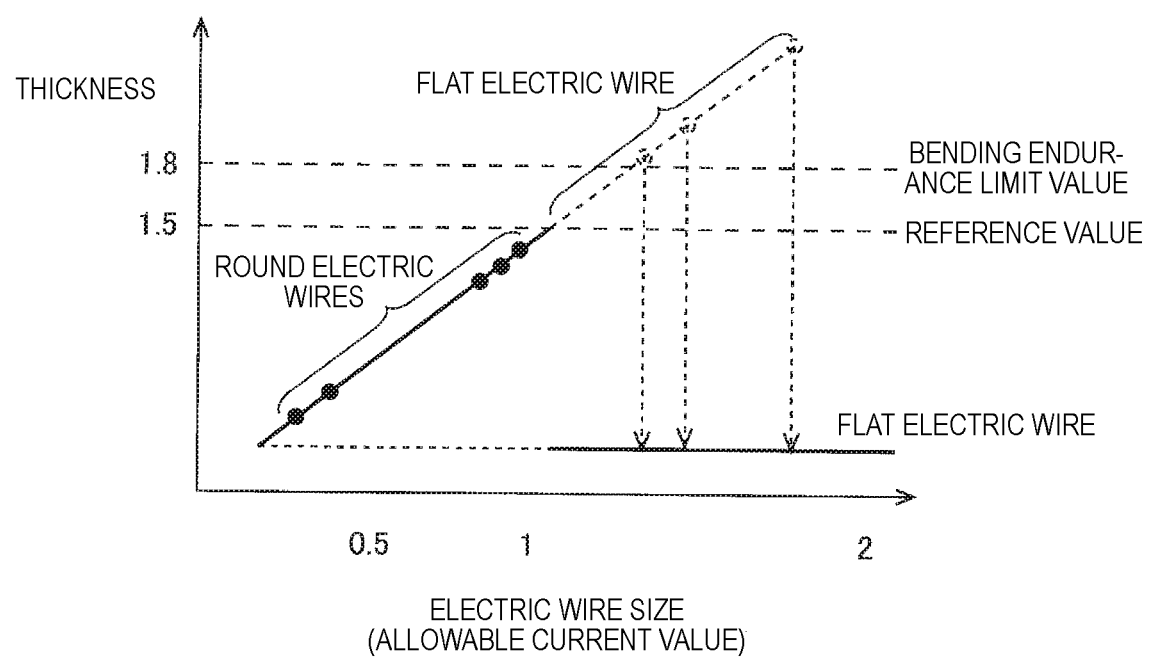
FIG. 6 is a graph for explaining a structure of the wire harness according to the present embodiment.

FIG. 6 is a graph for explaining a structure of the wire harness WH according to the present embodiment. First, the bending endurance limit value and the reference value will be described again.

For example, in a case where the wire harness WH according to the present embodiment is used for a slide door, it is assumed that a condition that "the increase in the resistance value is less than 10% with respect to the bending of the predetermined curvature of 10000 times" is defined. In this case, the minimum value of the thickness of the metal "in which the increase in the resistance value is 10% or more with respect to the bending of the predetermined curvature of 10000 times" becomes the bending endurance limit value. The bending endurance limit value is set to, for example, "1.8 (arbitrary unit)".

The reference value is set to be equal to or less than the bending endurance limit value. Therefore, for example, the reference value is set to "1.5 (arbitrary unit)". Incidentally, the reference value may be the same as the bending endurance limit value.

Next, the round conductor 11 and the flat conductor 21 according to the present embodiment will be described. In the present embodiment, the round conductor 11 has the diameter T1 equal to or less than the reference value. In the case where the plurality of round electric wires 10 are provided, the round conductors 11 of all round electric wires 10 have the diameter T1 equal to or less than the reference value.

Here, when the round conductor 11 has the diameter T1 equal to or less than the reference value, in a case where the allowable current value is desired to be increased, the round electric wire 10 may not be able to cope with the problem. Therefore, for the flat conductor 21 of the flat electric wire 20, the width W (the width W is determined) is increased so that the thickness T2 is equal to or less than the reference value and has the same cross-sectional area as the round conductor 11 (broken circle portions shown in FIG. 6) having the diameter T1 exceeding the reference value. That is, the cross-sectional area of the flat conductor 21 is larger than a cross-sectional area of the round conductor 11. Accordingly, a situation in which the round conductor 11 having the diameter T1 equal to or less than the reference value cannot cope with a large allowable current value is prevented.

In the wire harness WH, even if the bending of the predetermined number of times is applied in the surface folding direction, the diameter T1 of the round conductor 11 and the thickness T2 of the flat conductor 21 are set to be equal to or less than the reference value equal to or less than the bending endurance limit value. Therefore, the strain applied to the round conductor 11 and the flat conductor 21 becomes smaller, and the disconnection condition is not satisfied for the round conductor 11 and the flat conductor 21 even after the bending of the predetermined number of times.

In particular, as shown in FIG. 6, in the present embodiment, the flat conductor 21 has the thickness T2 smaller than the diameter T1 of any of the round conductors 11. Accordingly, the bending resistance of the flat conductor 21 is further improved.

In this way, according to the wire harness WH according to the present embodiment, since the round conductor 11 has the diameter T1 equal to or less than the predetermined reference value, the flat conductor 21 has the thickness T2 equal to or less than the reference value, the bending resistance can be improved. Further, since the flat conductor 21 has the width W sufficient to ensure the same cross-sectional area as the round conductor 11 having the diameter T1 exceeding the reference value, the flat electric wire 20 functions as a substitute for the round electric wire 10 having the round conductor 11 exceeding the reference value, so that the number of the round electric wires 10 cannot be reduced more than necessary. Accordingly, it is less likely to occur that the number of round electric wires 10 decreases and it is difficult to cope with the increase or decrease in circuit. Therefore, in the wire harness WH in which the round electric wires 10 and the flat electric wire 20 are extended in parallel, it is possible to improve the bending resistance while facilitating coping with the increase or decrease in the circuit.

Since the thickness T2 of the flat conductor 21 is smaller than the diameter T1 of the round conductor 11, the flat conductor 21 can be made thinner and the bending resistance can be improved.

Although the present invention has been described above based on the embodiment, the present invention is not limited to the above embodiment, and changes may be made without departing from the spirit of the present invention.

For example, in the round electric wire 10 according to the present embodiment, the round conductor 11 is configured by one single wire, but is not limited thereto, and may be configured by a stranded wire. In this case, the diameter T1 corresponds to a diameter of each strand.

The wire harness WH according to the present embodiment is not limited to a case where one bent portion BP is provided as shown in FIG. 1, and may be provided with a plurality of bent portions BP.

The flat conductor 21 is assumed to be the same metal as the round conductor 11, but may be a different metal.

DESCRIPTION OF REFERENCE NUMERALS AND SIGNS

1: wiring structure of wire harness
10: round electric wire
11: round conductor
12: coating portion
20: flat electric wire
21: flat conductor
22: coating portion
BP: bent portion
T1: diameter
T2: thickness
W: width
WH: wire harness

The invention claimed is:

1. A wire harness comprising:
a first round electric wire; and
a flat electric wire,
wherein the first round electric wire includes a round conductor made of a predetermined metal and having a round cross-sectional shape and a first coating portion,
wherein the flat electric wire includes a first flat conductor having a flat cross-sectional shape and a second coating portion,
wherein the first round electric wire and the flat electric wire are arranged in parallel,
wherein the round conductor has a diameter equal to or less than a predetermined reference value, and
wherein the first flat conductor has a thickness equal to or less than the reference value and a width which ensures the flat cross-sectional area of the first flat conductor is greater than an area of a circle having a diameter equal to the reference value.

2. The wire harness according to claim 1,
wherein the thickness of the first flat conductor is smaller than the diameter of the round conductor.

3. The wire harness according to claim 1,
wherein the reference value is a value determined to be equal to or less than a bending endurance limit value, and
wherein the bending endurance limit value is a minimum value of a thickness in a surface folding direction of a predetermined metal that satisfies a predetermined disconnection condition when a bending of a predetermined curvature is repeatedly applied a predetermined number of times in the surface folding direction.

4. The wire harness according to claim 1,
wherein the first round electric wire is spaced apart from the flat electric wire.

5. The wire harness according to claim 1, further comprising
a second flat conductor having a flat cross-sectional shape.

6. The wire harness according to claim 1, further comprising:
a second round electric wire.

7. The wire harness according to claim 6,
wherein the first round electric wire and the second round electric wire are both spaced apart from the flat electric wire.

8. The wire harness according to claim 7,
wherein the flat electric wire is accommodated along a long axis direction of an oblong cross section of the wire harness and the first round electric wire and the second round electric wire are stacked in a surface folding direction with the flat electric wire.

* * * * *